United States Patent [19]

Sponagel

[11] Patent Number: 5,213,642
[45] Date of Patent: May 25, 1993

[54] VEHICLE TIRE INCLUDING A BREAKER REINFORCEMENT LAYER COMPRISING OVERLAPPING BANDAGE STRIPS

[75] Inventor: Peter Sponagel, Wiesbaden, Fed. Rep. of Germany

[73] Assignee: SP Reifenwerke GmbH, Hanau, Fed. Rep. of Germany

[21] Appl. No.: 524,863

[22] Filed: May 18, 1990

[30] Foreign Application Priority Data

May 31, 1989 [DE] Fed. Rep. of Germany ....... 3917735

[51] Int. Cl.$^5$ .......................... B60C 9/18; B60C 9/22; B60C 9/26; B60C 9/30
[52] U.S. Cl. .................................. 152/455; 152/529; 152/531; 152/533; 152/536
[58] Field of Search ................ 152/528, 529, 526–527, 152/530–533, 536, 538, 455; 156/117

[56] References Cited

U.S. PATENT DOCUMENTS

| 2,958,359 | 11/1960 | Boussu et al. ........................ 152/531 |
| 3,130,769 | 4/1964 | Hindin et al. ..................... 152/531 X |
| 3,231,000 | 1/1966 | Massoubre ............................ 152/527 |
| 3,991,803 | 11/1976 | Praszek ................................ 152/533 |
| 4,129,162 | 12/1978 | DeWitt ................................. 152/538 |
| 4,184,529 | 1/1980 | Boileau ................................ 152/529 |
| 4,237,953 | 12/1980 | Mathevet ............................. 152/529 |
| 4,295,511 | 10/1981 | Mezzanotte et al. ............ 152/528 X |
| 4,434,965 | 11/1984 | Wagner et al. . | |
| 4,869,307 | 9/1989 | Bormann ............................. 152/533 |
| 4,924,927 | 5/1990 | Kawabata et al. ................... 152/531 |
| 4,987,938 | 1/1991 | Ushikubo et al. ............... 152/531 X |
| 5,032,198 | 7/1991 | Kojima et al. ................... 152/533 X |

FOREIGN PATENT DOCUMENTS

| 0215827 | 2/1958 | Australia .............................. 152/533 |
| 0258822 | 3/1988 | European Pat. Off. ............. 152/531 |
| 0305558 | 3/1989 | European Pat. Off. ............. 152/533 |
| 6353659 | 2/1990 | European Pat. Off. ............. 152/526 |
| 1416538 | 9/1965 | France ................................ 152/528 |
| 2428533 | 1/1980 | France ................................ 152/528 |
| 61-196803 | 9/1986 | Japan .................................. 152/527 |
| 62-292506 | 12/1987 | Japan .................................. 152/538 |
| 2-43027 | 2/1990 | Japan .................................. 156/117 |
| 2-43028 | 2/1990 | Japan .................................. 156/117 |
| WO90/01426 | 2/1990 | PCT Int'l Appl. .................. 152/526 |
| 1148116 | 4/1969 | United Kingdom ................ 152/455 |
| 1487426 | 9/1977 | United Kingdom ................ 152/533 |

Primary Examiner—Michael W. Ball
Assistant Examiner—Adrienne C. Johnstone

[57] ABSTRACT

A pneumatic vehicle tire with a radial carcass and a breaker reinforcement layer comprising a plurality of bandage strips each of which extend in the peripheral direction of the tire and which are differently overlapped when considered over the width of the breaker. The strips are preferably formed by a continuous winding of a single strip and may be combined with a conventional breaker ply.

12 Claims, 2 Drawing Sheets

VEHICLE TIRE INCLUDING A BREAKER REINFORCEMENT LAYER COMPRISING OVERLAPPING BANDAGE STRIPS

BACKGROUND OF THE INVENTION

The present invention relates to a vehicle tire comprising a radial carcass and tread reinforcing breaker or belt arranged between the carcass and tread.

Vehicle tires of this kind are generally known, and it is also known to influence the characteristics of particular vehicle tires by the layout of the breaker plies and components used and also by the choice of materials for such breaker components.

It is an object of the present invention to construct a vehicle tire of the above kind in such a way that the tire characteristics can be intentionally influenced to a high degree, in particular also in dependence on the respective layout of the profile over the width of the tire.

SUMMARY OF THE INVENTION

According to the present invention a vehicle tire comprises a radial carcass and a breaker reinforcement arranged between the carcass and a tread region, wherein at least one layer of the breaker insert comprises a plurality of at least partially overlapping bandage strips extending in the peripheral direction of the tire and wherein the width of the overlap x between individual bandage strips is selected to be different across at least a portion of the width of the tire.

By this construction it is possible, due to the choice of the width of the overlap between adjacently disposed strips, to predetermine the stiffness of the breaker in a defined manner for the individual regions of the total width of the breaker, and in particular to adapt the stiffness of the breaker to any variation in the tread stiffness resulting from the layout of the profile of the tread. Thus, the stiffness of the tread region and the stiffness of the breaker reinforcement assembly combine to produce a substantially uniform combined stiffness across the entire width of the tire.

Preferably the width of overlap between bandage strips is selected in the region of lower tread profile stiffness, i.e. in the region of the circumferential grooves, to be greater than the region of higher tread profile stiffness. Furthermore, while the overlap varies at least in part of the width of the breaker layer other parts may have an overlap or an edge to edge arrangement of the strips.

Thus great freedom can be taken in the design of the tread profile, since weak regions resulting from the tread profile layout, for example by the use of large grooves, can be fully compensated for by a correspondingly large overlap of the bandage strips in these regions.

It is possible also to achieve an advantageous reinforcement of a side of the tire particularly loaded by camber when run on a vehicle, in that the width of overlap between the bandage strips can be selected to be greater in the region of the side loaded by the camber, than it is at the opposite side where the load is less.

By presetting specific widths of overlap the dynamic contour of the particular tire can also be advantageously influenced and it can be assured that undesired increases in diameter due to high rotational tire speeds are effectively prevented. While this is provided by selecting the widths of overlap of the bandage strips, this may be further assisted by using for the bandage strips in some regions, a reinforcement material which has a higher restraining effect against undesired increases in tire diameter caused by high speed rotation. For example aramid, available as Kevlar (Registered Trade Mark), may be used as the reinforcement in the strip material in those regions in which a particularly pronounced restraining effect is desired.

Furthermore it is also possible to arrange layers of wound bandage strips above one another, such that the overlapping regions are formed which lie above one another in the radial direction of the tire. Such a design provides a strip wound C-fold type construction where the strips overlap in differing amounts. Both edges may be C-folded or in the case of a tire specially for a vehicle running with camber one wall of the tire may have a C-fold edge to a breaker ply. In both cases a further breaker layer, in particular for example a steel layer, can be provided within the C-fold layer.

BRIEF DESCRIPTION OF THE DRAWINGS

Some embodiments of the present invention will now be described, by way of example only, in conjunction with the attached diagrammatic drawings, wherein.

DETAILED DESCRIPTION OF THE INVENTION

Figure 1:
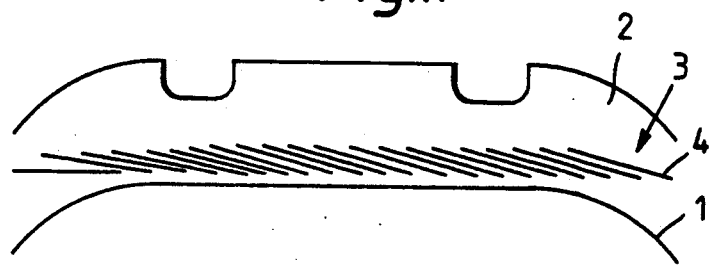
FIG. 1 is a schematic cross section of a tread and breaker according to the present invention.

The tire of FIG. 1 has a radial carcass 1, a tread region 2 and a breaker layer 3 arranged therebetween.

The breaker layer 3 comprises a plurality of bandage strips 4 each of which extend in the peripheral or circumferential direction of the tire and are wound continuously over an entire width of the tread region so as to be mutually overlapping as shown.

The width of each bandage strip is generally between 5 mm and 20 mm and the strips comprise parallel reinforcement cord materials such as polyester or nylon cords. The number of cords per strip can be for example 5 to 15 cords laid adjacent to one another and embedded in a topping material conventional in the art.

Figure 1A:
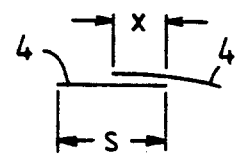
FIG. 1(a) is an enlarged details of FIG. 1.

FIG. 1(a) shows the relationship between two adjacent breaker strips 4 of the breaker. As can be seen the amount of overlap x is approximately half the width of the strips. This overlap x can be varied by adjusting the winding position for each strip and thus the amount of reinforcement material, i.e. the number of cords, can be varied across the width of the breaker as required.

It is an important feature of the invention that variations of reinforcement and thus variations of the stiffness of the tire in the tread zone between the sidewalls can be varied as desired.

Figure 1B:
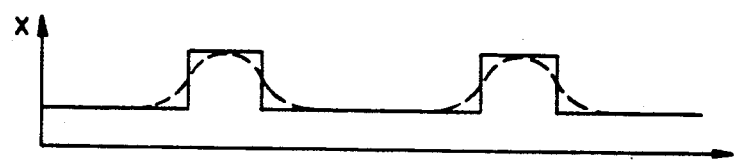
FIG. 1(b) is a graph of strip overlap for FIG. 1.

The manner in which the profile stiffness of the tire between the sidewalls, which changes due to the profile construction or layout, can be influenced by the breaker layer formed in accordance with the present invention is made clear in the diagrammatic representation of FIG. 1(b). The tread 2 of the tire in FIG. 1 has two pronounced peripheral grooves provided in the tread surface and so the profile stiffness of the tread region is greatly reduced in this region. In order to compensate for this, the bandage strips 4 are wound in the regions of the peripheral grooves with a substantially greater overlap x than in the rest of the breaker layer width. The stiffness characteristic is thus intentionally predetermined to a high degree by this pronounced increase of the overlap. Indeed this allows variation of overlap from zero to a complete overlap i.e. $0 \leq X \leq$ strip width and ready control of each part of the breaker width with respect to the reinforcement and thus in addition to other properties, its stiffness and the resultant tread/breaker stiffness between the sidewalls.

Figure 2:
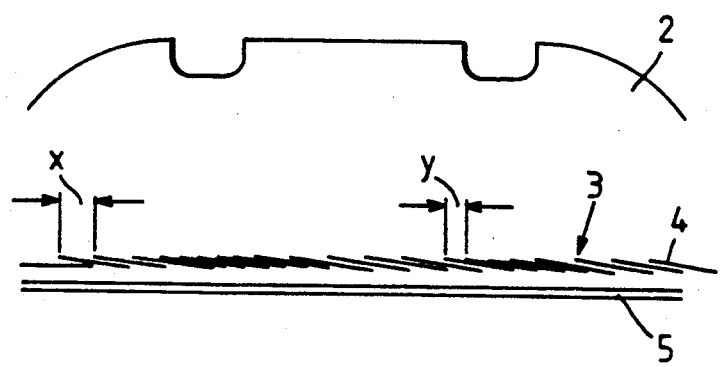
FIGS. 2 & 3 are a second and third variant of cross sections.

In a first variant of FIG. 2 a comparatively low overlap x is used in the shoulder regions of the tire, whereas a greater overlap y is used in the regions of the pronounced peripheral grooves. This provides different reinforcements in the different regions of the tire as set out above.

Figure 3:
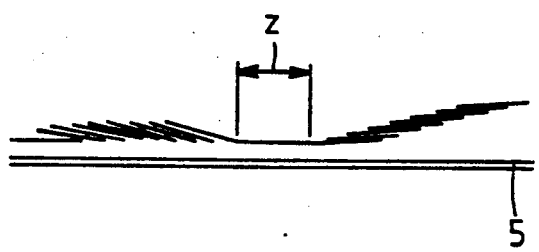

When desired, as a result of the desired stiffness conditions, in particular having regard for a particular bead stiffness dynamic contour, regions without overlap of the bandage strips 4 can also be provided, considered across the width of the tire, as is for example illustrated in the region z in the third variant shown in FIG. 3.

In addition to the wound breaker layer in accordance with the present invention one or more conventional breaker layers of cut edge or non-cut edge types can be used to make up the total breaker assembly, two layers being shown in FIGS. 2 and 3.

Figure 4:
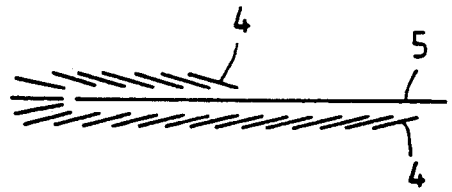
FIG. 4 is a cross section of an embodiment with a special camber-loaded side of the tire.

In FIG. 4 an embodiment of the present invention is shown providing an increased strength and stiffness at the camber loaded side of the tire. For this purpose a C-fold breaker construction is formed by winding the bandage strips 4, applying a further cut-edge breaker layer 5, which preferably consists of steel cords and then continuing winding of the strip to form an overlapping region i.e. a C-fold layer. In this case only one side is C-fold to suit the high camber edge of the tire.

A similar construction with a C-fold at both sides are, of course, possible though not shown here or explained in detail.

Figure 5:
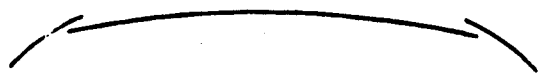
FIG. 5 is a schematic illustration of bandage windings which are subdivided over the width of the tire.

The reinforcement cords for the bandage strips can be any of the materials known in the art for breaker reinforcement cords including steel, aramid, or nylon. Indeed the breaker layer of the invention does not have to be wound throughout of the same material. It is, for example, possible to wind bandage strips of a first material, for example aramid, in the shoulder regions and to wind the middle region of bandage strips of a second material, for example nylon. In this way the different extension characteristics of the different materials can be ideally combined, and the desired restraining characteristics of these materials can be exploited at high speeds of rotation. Joints in the windings can be by various means including overlapped joints. FIG. 5 shows such a construction schematically.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Having now described my invention what I claim is:

1. A vehicle tire comprising a profiled tread region having a middle region and a pair of shoulder regions and containing a plurality of circumferential tread grooves, a radial carcass and a breaker reinforcement assembly disposed radially outward of the carcass and in said profiled tread region, said breaker reinforcement assembly including a first layer of a plurality of at least partially overlapping bandage strips extending in the peripheral direction of the tire, wherein bandage strips provided in each of said shoulder regions include cords made of a material of low elongation and bandage strips provided in said middle region include cords made of a material of a larger elongation compared to the cords of the bandage strips provided in each of said shoulder regions, and wherein the degree of overlap between adjacent bandage strips is increased radially below the circumferential tread grooves so that the stiffness in said regions is increased to compensate for the loss of stiffness due to the circumferential tread groove, whereby the stiffness of the tread region and the stiffness of the breaker reinforcement assembly produces a substantially uniform combined stiffness across the entire width of the tire.

2. The vehicle tire in accordance with claim 1 wherein a width of overlap between the bandage strips on a side of the tire designed to be loaded by wheel camber on the vehicle is greater than at the opposite side thereof.

3. The vehicle tire in accordance with claim 1 wherein said breaker reinforcement assembly further includes an additional breaker ply, including reinforcement cords, provided between the carcass and said first layer of bandage strips.

4. The vehicle tire in accordance with claim 1 wherein said breaker reinforcement assembly further includes an additional breaker ply having a pair of edges and including reinforcement cords, said additional breaker ply being disposed radially outward from said first layer, and said first layer enwrapping outwardly around at least one of the edges of said additional breaker ply so that said first layer provides a C-folded ply edge construction.

5. The vehicle tire in accordance with claim 4 wherein said breaker reinforcement assembly further includes an additional breaker ply having a pair of edges and including reinforcement cords, said additional breaker ply being disposed radially outward from said first layer, and said first layer enwrapping outwardly around both of the edges of said additional breaker ply so that said first layer provides a C-folded ply edge construction.

6. The vehicle tire in accordance with claim 1 wherein the bandage strips of said first layer having cords made of a material of low elongation mutually overlap the bandage strips of said first layer having cords made of a material of comparatively larger elongation.

7. The vehicle tire in accordance with claim 1 wherein the bandage strips of said first layer in each said shoulder region are reinforced with cords of aramid and the bandage strips in said middle region are reinforced with cords of nylon.

8. The vehicle tire in accordance with claim 1 wherein the bandage strips of said first layer are continuously wound over an entire width of the tread region.

9. The vehicle tire of claim 1 wherein the bandage strips of said first layer contain breaker reinforcement cords selected from the group consisting of steel, aramid and nylon.

10. The vehicle tire in accordance with claim 1 wherein said breaker reinforcement assembly further includes a plurality of breaker plies, said plurality of breaker plies being disposed radially inward from said first layer.

11. The vehicle tire in accordance with claim 1 wherein said first layer has a central portion and a pair of end portions, one of said pair of end portions including a folded back section such that a C-folded ply construction is disposed in one of the shoulder regions.

12. The vehicle tire in accordance with claim 1 wherein said first layer has a central portion and a pair of end portions, each of said pair of end portions including a folded back section such that a C-folded ply construction is disposed in each of the shoulder regions.

* * * * *